United States Patent [19]
Lesimple et al.

[11] Patent Number: 6,033,106
[45] Date of Patent: Mar. 7, 2000

[54] TORQUE LIMITER DRIVING HEAD FOR PAINT CANS WITH A STIRRER

[75] Inventors: Michel Denis Lesimple, Coulombs; Jacky Emile Gaulupeau, Boullay-Thierry, both of France

[73] Assignee: Fillon Pichon Societe Anonyme, Eure et Loir, France

[21] Appl. No.: 08/841,932

[22] Filed: Apr. 8, 1997

[30] Foreign Application Priority Data

Oct. 9, 1996 [FR] France .................................. 96 12304

[51] Int. Cl.[7] .................................. B01F 7/20; F16D 7/00
[52] U.S. Cl. .......................... 366/198; 366/331; 366/605; 192/56.1; 464/30; 464/37
[58] Field of Search .................................. 366/197, 198, 366/241–252, 331, 605; 464/30, 37, 41, 185; 474/152, 161; 403/32, 383; 192/56.1

[56] References Cited

U.S. PATENT DOCUMENTS

| | | | |
|---|---|---|---|
| 2,603,461 | 7/1952 | Marienthal | 366/605 X |
| 2,757,910 | 8/1956 | O'Neill | 366/605 X |
| 2,802,649 | 8/1957 | Stockton | 366/197 |
| 2,854,830 | 10/1958 | Steinbrecker . | |
| 2,965,363 | 12/1960 | Worden | 366/197 |
| 3,118,653 | 1/1964 | Dedoes | 366/200 |
| 3,406,583 | 10/1968 | Baier . | |
| 3,745,790 | 7/1973 | Ryan . | |
| 4,043,437 | 8/1977 | Taylor . | |
| 4,327,563 | 5/1982 | Allmacher, Jr. . | |
| 5,000,721 | 3/1991 | Williams | 464/37 |
| 5,160,198 | 11/1992 | Fillon | 366/198 |
| 5,169,232 | 12/1992 | Fillon et al. | 366/605 X |
| 5,542,761 | 8/1996 | Dedoes . | |
| 5,601,491 | 2/1997 | Chan et al. | 192/56.1 X |

FOREIGN PATENT DOCUMENTS

| | | | |
|---|---|---|---|
| 284676 | 4/1970 | Australia . | |
| 0409715 | 1/1991 | European Pat. Off. . | |
| 0461326 | 12/1991 | European Pat. Off. . | |
| 2102417 | 4/1972 | France | 366/198 |
| 809877 | 8/1951 | Germany . | |
| 4344151 | 6/1995 | Germany . | |
| 2203059 | 10/1988 | United Kingdom | 366/605 |

*Primary Examiner*—Charles E. Cooley
*Attorney, Agent, or Firm*—Robert W. Becker & Associates

[57] ABSTRACT

A torque limiter driving head for paint cans with a stirrer is arranged in a storage cabinet for the paint cans. A number of rotatably driven pulleys and a matching number of stirring shafts are provided. The pulleys have a hub and the stirring shafts are inserted into the hubs. The hubs have elastic, radially inwardly projecting tabs. The stirring shafts have a non-circular portion engaged by the elastic, radially inwardly projecting tabs. The stirring shafts comprise a transverse pin-and-blade arrangement for driving stirrers of the paint cans.

19 Claims, 3 Drawing Sheets

TORQUE LIMITER DRIVING HEAD FOR PAINT CANS WITH A STIRRER

FIELD OF THE INVENTION

This invention relates to stirring cabinets for paint cans. These cabinets generally comprise a plurality of floors formed by hollow plates inside which a set of pulleys are placed for driving stirring heads that are engaged with a complementary portion of a can of paint to be stirred.

BACKGROUND OF THE INVENTION

Generally, all the stirring heads of a same cabinet are simultaneously driven, and users of paint cans will grasp one of the cans and then put it back in place without having to take any particular care and without resulting in an interruption of working of the corresponding stirring head.

PURPOSE OF THE INVENTION

The present invention relates to a device that enables to limit the torque that is transmitted by each stirring head in order that no risk of accident can occur.

The invention provides moreover to greatly simplify manufacturing of the constitutive parts of the stirring heads so to reduce the installation and maintenance costs.

According to the invention, the constitutive parts of the stirring heads are assembled together without using any tool, and their working does not necessitate any lubricant. Moreover, the torque limiting action is produced without noise and without it being necessary to make a re-engagement.

SUMMARY OF THE INVENTION

According to the invention, the torque limiter driving head for paint cans with a stirrer, these paint cans being arranged in a cabinet, comprises a set of rotatively driven pulleys, and is characterized in that each said pulleys has a hub with these pulleys being connected to a shaft by means of elastic tabs protruding from this hub and exerting an opposite elastic bias on a non circular portion of a shaft having a transverse pin for activating the stirring head of the paint can.

The torque limiter driving head for paint cans according to the present invention is primarily characterized by:

- a number of rotatably driven pulleys and a matching number of stirring shafts;
- the pulleys having a hub and the stirring shafts inserted into the hubs;
- the hubs having elastic, radially inwardly projecting tabs;
- the stirring shafts having a non-circular portion engaged by the elastic, radially inwardly projecting tabs;
- the stirring shafts comprising a transverse pin-and-blade arrangement for driving stirrers of the paint cans.

The non-circular portions have a convex polygonal shape with n sides, n being preferably four.

The sides are preferably convexly curved.

The stirring shafts comprise a connecting arrangement including a disk and a wavy crown positioned below the disk, wherein the disks are supported at the pulleys such that the wavy crowns are positioned within the hubs, wherein the elastic, radially inwardly projecting tabs are curved and engage the wavy crowns.

The pulleys further comprise a circular bearing below the elastic, radially inwardly projecting tabs. The connecting arrangements further include a cylindrical bearing positioned below the wavy crowns. The connecting arrangements further comprise a securing crown inserted between the cylindrical bearings and the circular bearings.

The inventive driving head further comprises base plates having a receiving opening. The stirring shafts have an enlarged part received in receiving opening. The stirring shafts have a ring below the enlarged part and a sleeve above the enlarged part. The pulleys have a collar at the hub. The stirring shafts are axially secured by the collar engaging the sleeve and by the ring abutting an underside of the base plate.

The base plates have a swan-neck shape with a downwardly extending abutment for preventing rotation of the paint cans.

The inventive driving head further comprises a toothed belt for driving the pulleys.

Various other features of the invention will moreover be revealed from the following detailed disclosure.

BRIEF DESCRIPTION OF THE DRAWINGS

Embodiments of the invention are shown, as non limitative examples, in the accompanying drawings, wherein.

DETAILED DESCRIPTION OF THE INVENTION

Figure 1:
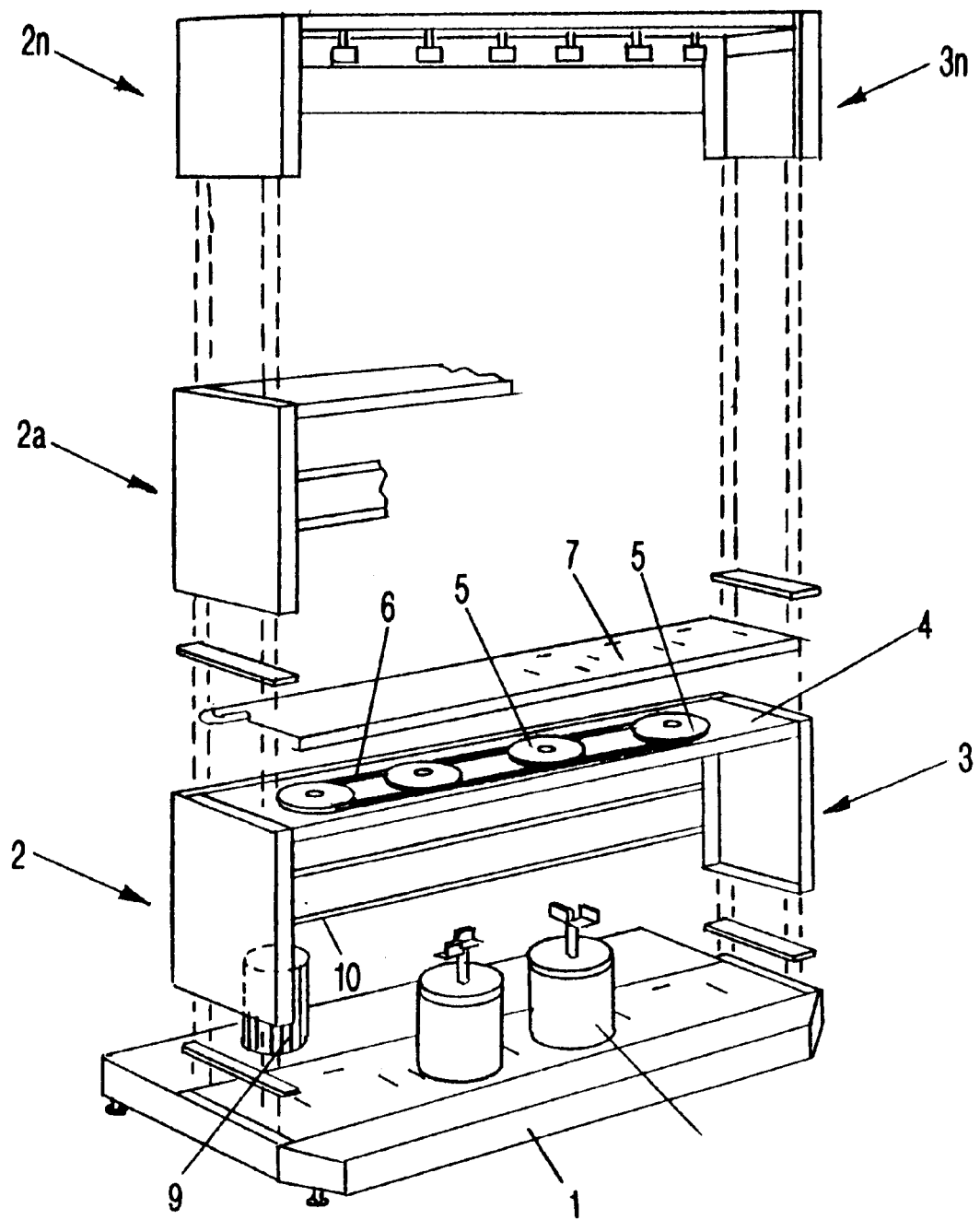
FIG. 1 is an exploded perspective view of a cabinet for paint cans with a stirrer.

Referring now to the drawings, FIG. 1 shows a cabinet comprising a base plate 1 provided on its top portion with lateral sides 2, 3 which can be of any height, these lateral sides 2, 3 being advantageously formed by successive portions 2, 2a, . . . , 2n; 3, 3a, . . . , 3n.

The above mentioned lateral sides or, preferably, the successive portions such as 2, 3 are connected by plates 4 that support a set of pulleys 5 that are connected together by an endless transmission member 6, for example a toothed belt. The pulleys 5 are covered by a platen 7, with this platen constituting a cover and a support.

As shown in the drawings, a set of paint cans 8 are placed on the base plate 1, and similar cans are positioned on the platen 7 that covers the set of pulleys 5.

The cabinet may comprise any number of floors formed each time by a plate 4 and a platen 7 between which the pulleys 5 are arranged. The pulleys 5 of different floors are driven by means of an electric motor 9 connected to pulleys of each floor through a shaft 10 or similar.

Each pulley 5 comprises a hub 11 for driving a shaft 12 of a stirring head 13 corresponding to each pulley 5.

As shown in FIG. 1, each stirring head 13 is designed to cooperate with the head of a stirrer S provided on each can 8.

Figure 2:
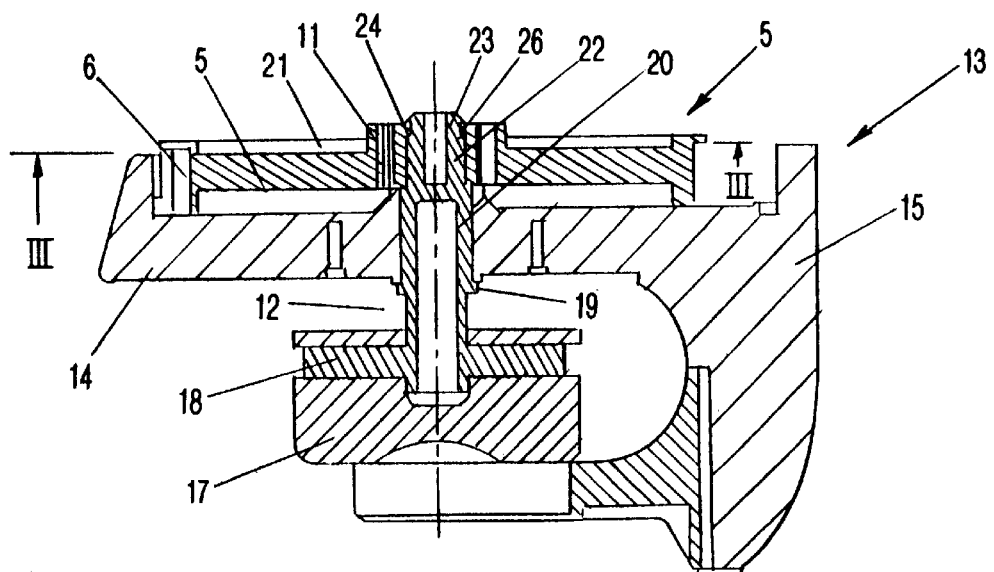
FIG. 2 is an elevation cross-section of one of the stirring heads of the cabinet of FIG. 1.
Figure 4:
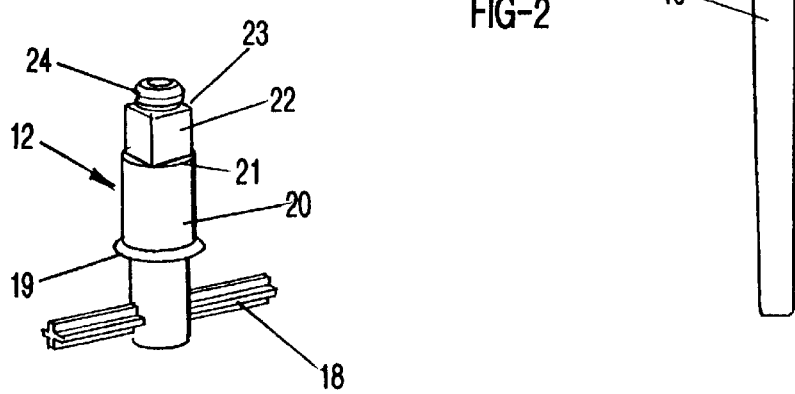
FIG. 4 is a perspective view of one of the members of the stirring head.
Figure 3:
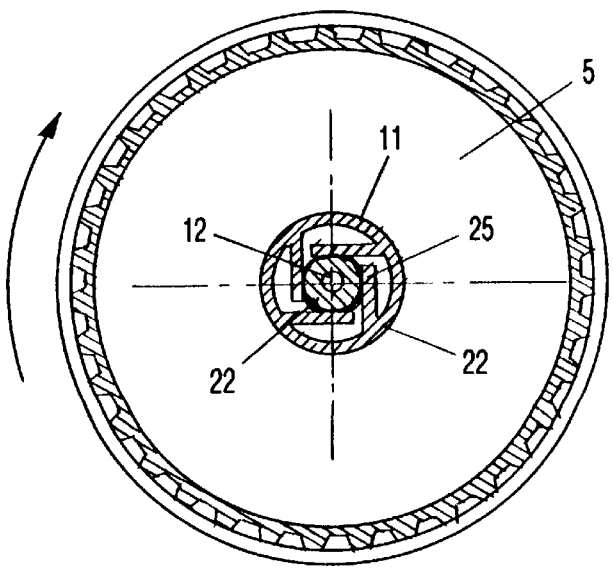
FIG. 3 is a cross-section taken along line III—III of FIG. 2.

FIGS. 2–4 illustrate an embodiment in which the stirring heads 13 rotatively drive a stirrer S while preventing the can 8 rotating.

The stirring head 13 comprises, therefore, a base plate 14 having a swan-neck shape 15 that comprises an abutment 16 preventing to rotation of a corresponding can 8. Each base plate 14 is supported by the plate 4 of each floor of the cabinet.

The stirrer S of the can 8 is driven in a known manner by a small blade 17 that is protrudingly mounted on a pin 18 that is transversely carried by the stirring shaft 12 near the lower end thereof.

The shaft 12 comprises, above the pin 18, a ring 19 bearing on the underside of the base plate 14 through which extends an enlarged part 20 of the shaft 20. Above the enlarged part 20, the shaft 12 has a shoulder 21 at the base of a portion 22 having a non-circular cross-sectional shape. The shape can be a polygonal shape with n convex sides, for example four sides.

Above the portion 22, the shaft 12 has a groove 23 and a sleeve 24.

FIG. 3 shows that the hub 11 of the pulley 5 is provided inside with tabs 25 that bear on the portion 22. The tabs 25, as can be seen in FIG. 3, each have a concave portion matching the convex shape of the four sides of the portion 22. Moreover, each pulley 5 has a collar 26 engaging the groove 23 of the shaft 12.

It is advantageous to manufacture the pulleys 5 as above described from a molded synthetic material having good elasticity properties. Polyacetal materials can be used for this purpose, as well as polyamide materials, which results in the tab 25 of the hub 11 being elastic tabs. The shaft 12 can also be made of a plastic material.

When the stirrer S of a paint can 8 is engaged by the small blade 17, this stirring shaft S is normally rotatively driven simultaneously with the various pulleys 5 that are provided on each floor of the cabinet.

The pressure that is applied by the tabs 25 on the portion 22 of the shaft 12 drives this shaft and, consequently, transmits its movement to the corresponding stirring shaft 13.

If, for any reason, the torque to be applied to the shaft 12 is increased, for example because of a misalignment of a can 8 or if, because of a clumsiness of a user, the user grasps the small blade 17, or still if there is a paint that happens to be solidified in the can, then this torque increase results in that the tabs 25 will slide with respect to the portion 22.

The bulged shape that is advantageously given to the side of the polygonal portion 22 provides that the assembly comprised of the tabs 25 and portion 22 acts as a torque limiter coupling having a progressive function.

The above described embodiment permits an extremely fast mounting. Actually, it suffices to engage the shaft 12 in a receiving opening of the base plate 14 by introducing therein the enlarged part 20. A next step is to thread the pulley 5 up to the point at which the collar 26 enters the groove 23 by an elastic deformation.

Figure 5:
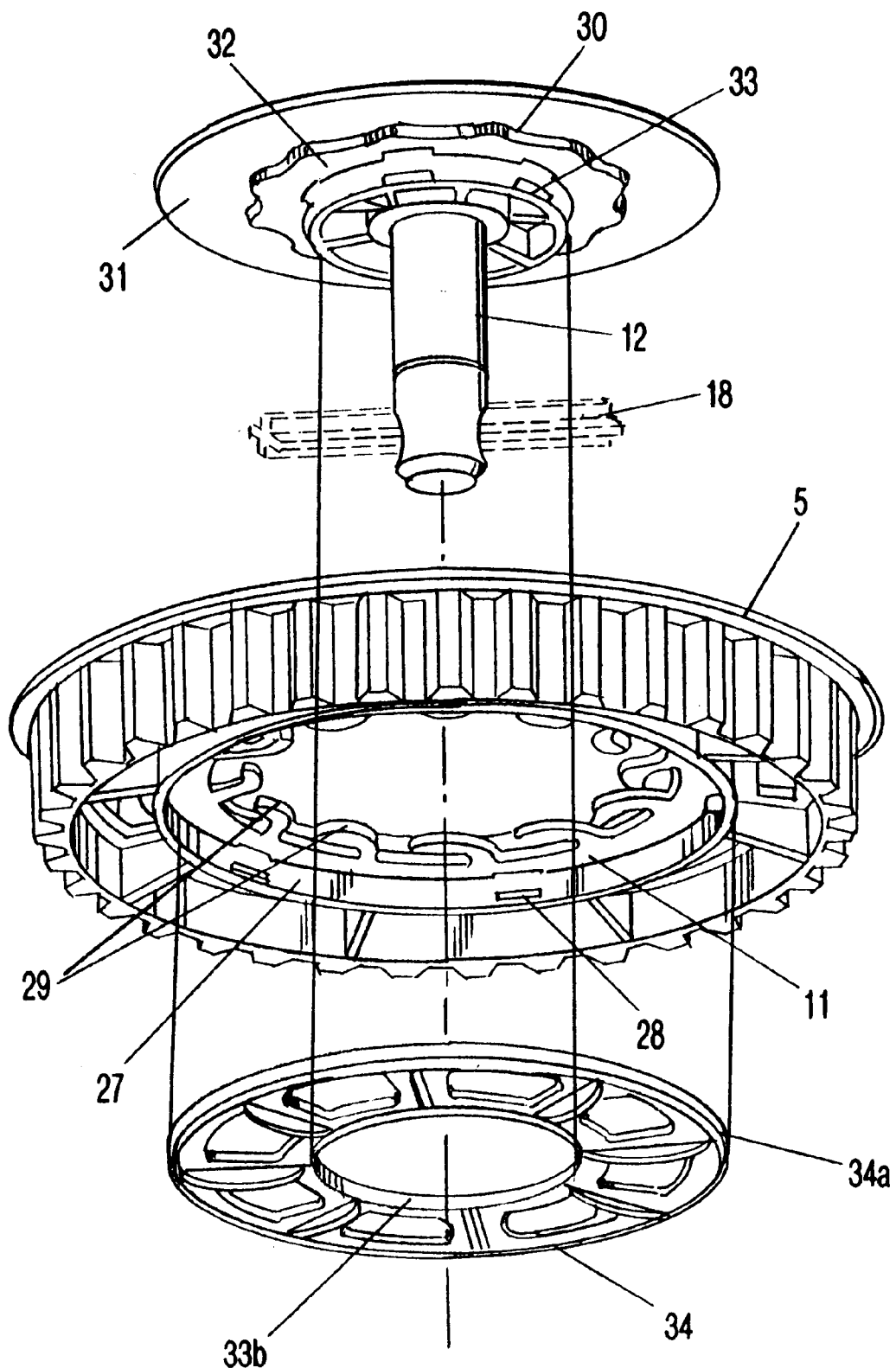
FIG. 5 is an exploded perspective view of a stirring head according to a variant of embodiment.

FIG. 5 illustrates a variant according to which the hub 11 of the pulley 5 is formed, at its top portion, with a circular bearing 27 comprising a plurality of protrusions 28 near its lower edge.

The hub 11 is provided inside with curved tabs 29 that cooperate with a connecting arrangement including a wavy crown 30 formed beneath a disk 31. The number of wave peaks of the crown 30 corresponds preferably to the number of tabs 29.

In this embodiment, the shaft 12, provided with its transverse pin 18, protrudes beneath the wavy crown 30.

Besides what has been described above, a cylindrical bearing 32 of the connecting arrangement protrudes beneath the wavy crown 30 and is provided with clipping tabs 33.

FIG. 5 shows also a securing crown 34 of the connecting arrangement having an outer diameter 34a corresponding to diameter of the circular bearing 27 of the pulley 5, with an inner diameter 34b of the securing crown 34 corresponding to diameter of the cylindrical bearing 32.

As in the preceding example of embodiment, the various parts as described are advantageously made of molded synthetic material.

For performing the assembly, the disk 31 is brought on the top of the pulley 5, which results in positioning the wavy crown 30 opposite the curved tabs 29. The cylindrical bearing 32 is then at a same level as the circular bearing 27.

By engaging the securing crown 34 between the cylindrical bearing 32 and the circular bearing 27, the disk 31 is axially locked by the protrusions 28 and clipping tabs 33 without impeding the rotary movement which may possibly occur.

Driving the pulley 5 results in that the curved tabs 29, that correspond to the waves of the crown 30, will drive this crown 30 and consequently the shaft 12. If an increase of the torque applied to the shaft 12 seems too great, the wave peaks of the crown 30 will escape by elastically bending the curved tabs 29. Driving is again provided if the resisting torque decreases.

The hereinabove described disconnectable safety driving has the pecularity to act as a semi elastic coupling, at start and in case of small overloads before reaching its torque of disconnection.

Since the tabs 25 on the portion 22 are elastic, they take the jolts by flexibility while ensuring a drive of the shaft 12.

A wide variety of embodiment and other modifications may be devised without departing from the spirit and scope of the present invention.

The present invention is, of course, in no way restricted to the specific disclosure of the specification and drawings, but also encompasses any modifications within the scope of the appended claims.

What I claim is:

1. A torque limiter driving head for paint cans with a stirrer, said torque limiter driving head and the paint cans arranged in a storage cabinet, said torque limiter driving head comprising:

a number of rotatably driven pulleys and a matching number of stirring shafts;

said pulleys each having a hub and said stirring shafts inserted into said hubs;

said hubs each having elastic, radially inwardly projecting tabs;

said stirring shafts each having a non-circular portion engaged by said elastic, radially inwardly projecting tabs;

said stirring shafts each comprising a transverse pin-and-blade arrangement, extending transverse to said stirring shafts, for driving the stirrers of the paint cans;

wherein said non-circular portion has a convex polygonal shape with n sides.

2. A torque limiter driving head according to claim 1, wherein n is four.

3. A torque limiter driving head according to claim 1, wherein said sides are convexly curved.

4. A torque limiter driving head according to claim 3, wherein said tabs each have a concave portion matching the convex shape of one of said n sides of said convex polygonal shape.

5. A torque limiter driving head according to claim 1, further comprising a toothed belt for driving said pulleys.

6. A torque limiter driving head for paint cans with a stirrer, said torque limiter driving head and the paint cans arranged in a storage cabinet, said torque limiter driving head comprising:
- a number of rotatably driven pulleys and a matching number of stirring shafts;
- said pulleys each having a hub and said stirring shafts inserted into said hubs;
- said hubs each having elastic, radially inwardly projecting tabs;
- said stirring shafts each having a non-circular portion engaged by said elastic, radially inwardly projecting tabs;
- said stirring shafts each comprising a transverse pin-and-blade arrangement, extending transverse to said stirring shafts, for driving the stirrers of the paint cans;
- wherein said stirring shafts each comprise a connecting arrangement including a disk and a wavy crown positioned below said disk, wherein said disks are supported at said pulleys such that said wavy crowns are positioned within said hubs, wherein said elastic, radially inwardly projecting tabs are curved and engage said wavy crowns;
- wherein said pulleys further comprise a circular bearing below said elastic, radially inwardly projecting tabs;
- said connecting arrangements further include a cylindrical bearing positioned below said wavy crowns;
- said connecting arrangements further comprise a securing crown inserted between said cylindrical bearings and said circular bearings.

7. A torque limiter driving head according to claim 6, further comprising a toothed belt for driving said pulleys.

8. A torque limiter driving head for paint cans with a stirrer, said torque limiter driving head and the paint cans arranged in a storage cabinet, said torque limiter driving head comprising:
- a number of rotatably driven pulleys and a matching number of stirring shafts;
- said pulleys each having a hub and said stirring shafts inserted into said hubs;
- said hubs each having elastic, radially inwardly projecting tabs;
- said stirring shafts each having a non-circular portion engaged by said elastic, radially inwardly projecting tabs;
- said stirring shafts each comprising a transverse pin-and-blade arrangement, extending transverse to said stirring shafts, for driving the stirrers of the paint cans;
- further comprising base plates having a receiving opening and supported on plates forming floors of the storage cabinets;
- said stirring shafts having an enlarged part received in said receiving opening;
- said stirring shafts having a ring below said enlarged part and a sleeve above said enlarged part;
- said pulleys having a collar at said hub;
- said stirring shafts axially secured by said collar engaging said sleeve and by said ring abutting an underside of said base plate.

9. A torque limiter driving head according to claim 8, wherein said non-circular portions have a convex polygonal shape with n sides.

10. A torque limiter driving head according to claim 9, wherein n is four.

11. A torque limiter driving head according to claim 9, wherein said sides are convexly curved.

12. A torque limiter driving head according to claim 11, wherein said tabs each have a concave portion matching said convexly curved sides.

13. A torque limiter driving head according to claim 8, further comprising a toothed belt for driving said pulleys.

14. A torque limiter driving head for paint cans with a stirrer, said torque limiter driving head and the paint cans arranged in a storage cabinet, said torque limiter driving head comprising:
- a number of rotatable driven pulleys and a matching number of stirring shafts;
- said pulleys each having a hub and said stirring shafts inserted into said hubs;
- said hubs each having elastic, radially inwardly projecting tabs;
- said stirring shafts each having a non-circular portion engaged by said elastic, radially inwardly projecting tabs;
- said stirring shafts each comprising a transverse pin-and-blade arrangement, extending transverse to said stirring shafts, for driving the stirrers of the paint cans;
- further comprising base plates having a receiving opening and supported on plates forming floors of the storage cabinets;
- wherein said base plates each have a swan-neck shape with a downwardly extending abutment for preventing rotation of the paint cans.

15. A torque limiter driving head according to claim 14, wherein said non-circular portions have a convex polygonal shape with n sides.

16. A torque limiter driving head according to claim 15, wherein n is four.

17. A torque limiter driving head according to claim 15, wherein said sides are convexly curved.

18. A torque limiter driving head according to claim 17, wherein said tabs each have a concave portion matching said convexly curved sides.

19. A torque limiter driving head according to claim 14, further comprising a toothed belt for driving said pulleys.

* * * * *